United States Patent
Stripp

Patent Number: 6,076,364
Date of Patent: Jun. 20, 2000

[54] SHIP WITH SNOW MAKING CAPABILITIES UTILIZING SEAWATER

[76] Inventor: Heinz G Stripp, 204 Hydepark, Somerset, N.J. 08873

[21] Appl. No.: 09/263,279

[22] Filed: Mar. 5, 1999

[51] Int. Cl.[7] .................................................. B01D 9/04
[52] U.S. Cl. ............................................. 62/123; 62/240
[58] Field of Search ............................. 62/532, 123, 240

[56] References Cited

U.S. PATENT DOCUMENTS

| | | | |
|---|---|---|---|
| 3,049,890 | 8/1962 | Ruppel | 62/240 |
| 3,344,616 | 10/1967 | Owen | 62/123 |
| 3,817,051 | 6/1974 | Seliber | 62/123 |
| 4,453,960 | 6/1984 | Anderpont | 62/123 |
| 4,922,724 | 5/1990 | Grayson et al. | 62/240 |
| 4,936,102 | 6/1990 | Goldstein et al. | 62/240 |
| 5,400,619 | 3/1995 | Husseiny et al. | 62/123 |

*Primary Examiner*—William E. Tapolcal
*Attorney, Agent, or Firm*—Goldstein & Canino

[57] ABSTRACT

A ship with snow making capabilities utilizing seawater including a ship capable of floating in sea water. The ship has bridge controls to control all functions of the ship. The bridge controls are in communication with substation controls, navigation controls, and propulsion controls. The bridge controls further includes snow making and water harvesting controls. The ship has a sea water intake. The ship has an air intake. The air intake is in communication with an air compressor disposed within the ship. The air compressor has controls associated therewith. A snow making machine is positioned within the ship. The snow making machine is in communication with the sea water intake for receiving sea water therefrom. The snow making machine converts the sea water to snow for being stored in holds on the ship. A brine bilge system accumulates brine drained from the snow. The brine bilge system includes a sump and controls for monitoring the brine in the holds and pumping the brine out of the holds.

7 Claims, 2 Drawing Sheets

SHIP WITH SNOW MAKING CAPABILITIES UTILIZING SEAWATER

BACKGROUND OF THE INVENTION

The present invention relates to a ship with snow making capabilities utilizing seawater and more particularly pertains to making snow from seawater by separating brine therefrom.

When sea water freezes, it frosts out most dissolved impurities in it while turning to ice. Sea water desalting is well known in the art which includes distillation, which condenses steam from boiling sea water to make fresh water. Flash evaporation destroys sea water in a vacuum to obtain fresh water. Reverse osmosis essentially filters sea water to obtain fresh water. The present invention is a radical departure from conventional sea water desalting methods without any relationship to any existing prior art in this field.

The present invention is a snow maker installation modified to make snow from sea water on and into an ocean going vessel which separates the resulting brine from the snow back to the ocean or to an on board storage facility for later use. The snow is melted into fresh water which can be contained in bottles or other containers or in bulk for deliver to land.

The use of desalination processes is known in the prior art. More specifically, desalination processes heretofore devised and utilized for the purpose of desalinating water are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,400,619 to Husseiny discloses a method for purification and desalination of water by freezing. U.S. Pat. No. 4,512,160 to Arias Mas discloses a machine for spraying sea water onto a drum for freezing thereby creating ice flakes for use on a fishing ship. U.S. Pat. No. 4,356,015 to Oliver discloses a desalination process involving both freezing and pressure stages. U.S. Pat. No. 4,191,491 and 4,166,363 both to Mougin each show means for maintaining polls on icebergs, used as a supply of fresh water. U.S. Pat. No. 4,567,731 to Horan discloses a means to create an artificial iceberg by spraying fresh water in a sub zero climate, for transport of fresh water.

While these devices fulfill their respective, particular objective and requirements, the aforementioned patents do not describe a ship with snow making capabilities utilizing seawater for making snow from seawater by separating brine therefrom.

In this respect, the ship with snow making capabilities utilizing seawater according to the present invention substantially departs from the conventional concepts and designs of the prior art, and in doing so provides an apparatus primarily developed for the purpose of making snow from seawater by separating brine therefrom.

Therefore, it can be appreciated that there exists a continuing need for new and improved ship with snow making capabilities utilizing seawater which can be used for making snow from seawater by separating brine therefrom. In this regard, the present invention substantially fulfills this need.

SUMMARY OF THE INVENTION

In the view of the foregoing disadvantages inherent in the known types of desalination processes now present in the prior art, the present invention provides an improved ship with snow making capabilities utilizing seawater. As such, the general purpose of the present invention, which will be described subsequently in greater detail, is to provide a new and improved ship with snow making capabilities utilizing seawater and method which has all the advantages of the prior art and none of the disadvantages.

To attain this, the present invention essentially comprises a ship capable of floating in sea water. The ship has bridge controls to control all functions of the ship. The bridge controls are in communication with substation controls, navigation controls, and propulsion controls. The bridge controls further includes snow making and water harvesting controls. The ship has a sea water intake. The sea water intake has temperature sensors in communication therewith. The sea water intake further includes a supply control valve. The ship has an air intake. The air intake is in communication with an air compressor disposed within the ship. The air compressor has controls associated therewith. A snow making machine is positioned within the ship. The snow making machine is in communication with the sea water intake for receiving sea water therefrom. The snow making machine converts the sea water to snow for being stored in holds on the ship. A brine bilge system accumulates brine drained from the snow. The brine bilge system includes a sump and controls for monitoring the brine in the holds and pumping the brine out of the holds. A bottling system is in communication with the holds. The bottling system includes extraction pumps with supply lines for drawing fresh water out of the holds for storing in bottles. A hold control system is in communication with the holds of the ship. The hold control system selectively heats or cools the holds. The hold control system further includes a monitor. A hatch and cover system covers and protects hatchways and deck openings in the ship.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ship with snow making capabilities utilizing seawater which has all the advantages of the prior art desalination processes and none of the disadvantages.

It is another object of the present invention to provide a new and improved ship with snow making capabilities utilizing seawater which may be easily and efficiently manufactured and marketed.

It is a further object of the present invention to provide a new and improved ship with snow making capabilities utilizing seawater which is of durable and reliable construction.

An even further object of the present invention is to provide a new and improved ship with snow making capabilities utilizing seawater which is susceptible of a low cost of manufacture with regard to both materials and labor, and which accordingly is then susceptible of low prices of sale to the consuming public, thereby making such a ship with snow making capabilities utilizing seawater economically available to the buying public.

Even still another object of the present invention is to provide a new and improved ship with snow making capabilities utilizing seawater for making snow from seawater by separating brine therefrom.

Lastly, it is an object of the present invention to provide a new and improved ship with snow making capabilities utilizing seawater including a ship capable of floating in sea water. The ship has bridge controls to control all functions of the ship. The bridge controls are in communication with substation controls, navigation controls, and propulsion controls. The bridge controls further includes snow making and water harvesting controls. The ship has a sea water intake. The ship has an air intake. The air intake is in communication with an air compressor disposed within the ship. The air compressor has controls associated therewith. A snow making machine is positioned within the ship. The snow making machine is in communication with the sea water intake for receiving sea water therefrom. The snow making machine converts the sea water to snow for being stored in holds on the ship. A brine bilge system accumulates brine drained from the snow. The brine bilge system includes a sump and controls for monitoring the brine in the holds and pumping the brine out of the holds.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
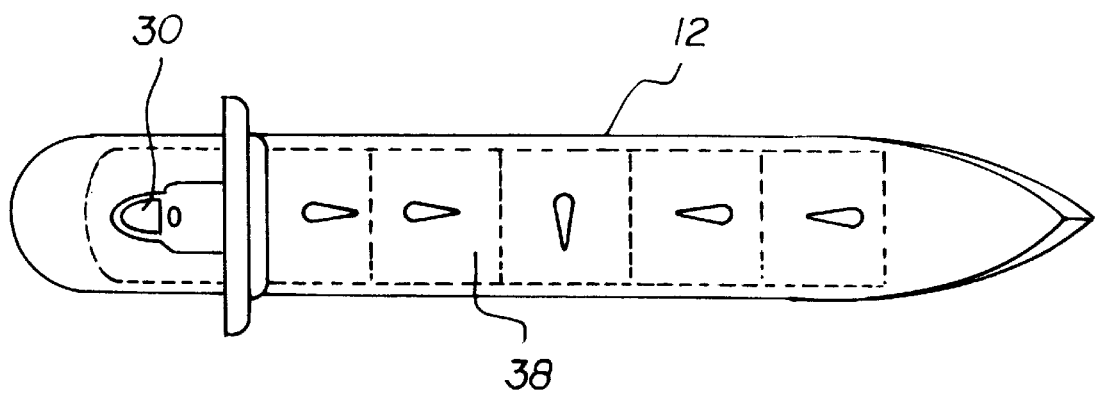
FIG. 1 is a plan view of the preferred embodiment of the ship with snow making capabilities utilizing seawater constructed in accordance with the principles of the present invention.
Figure 2:
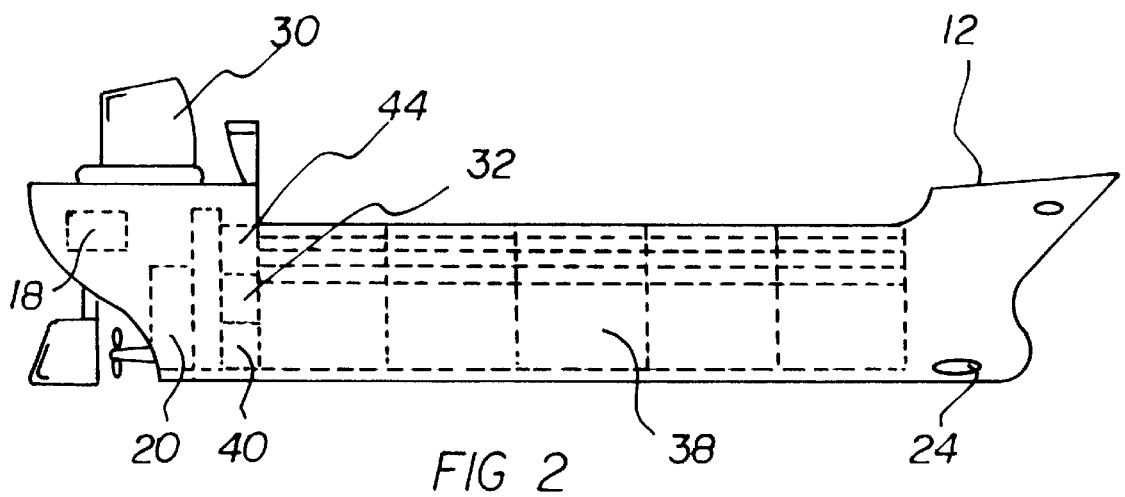
FIG. 2 is a side view of the ship of the present invention.
Figure 3:
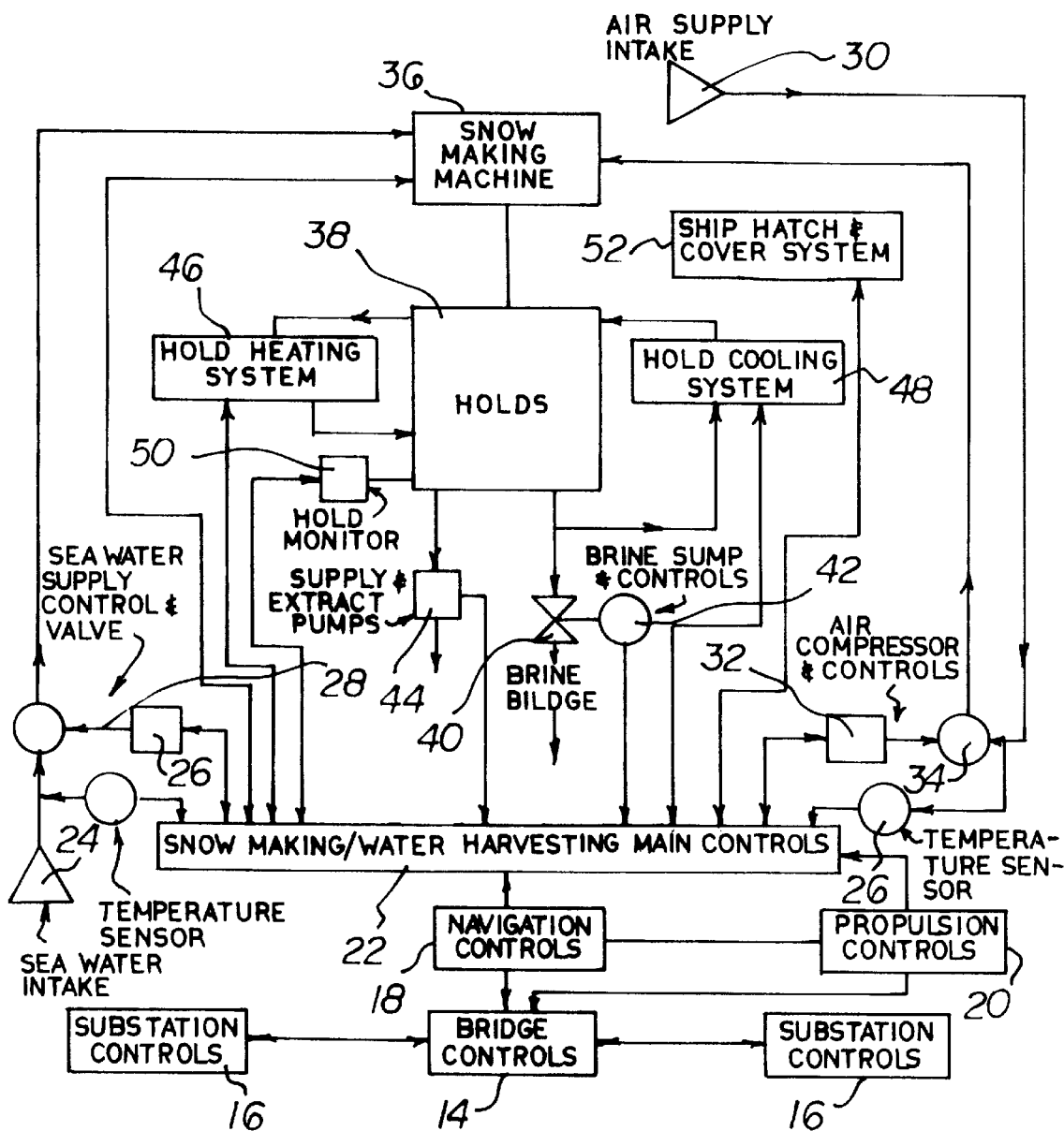
FIG. 3 is a flow chart illustration of the present invention.

With reference now to the drawings, and in particular, to FIGS. 1 through 3 thereof, the preferred embodiment of the new and improved ship with snow making capabilities utilizing seawater embodying the principles and concepts of the present invention and generally designated by the reference number 10 will be described.

Specifically, it will be noted in the various Figures that the device relates to a ship with snow making capabilities utilizing seawater for making snow from seawater by separating brine therefrom. In its broadest context, the device consists of a ship, a snow making machine, a brine bilge system, a bottling system, a hold control system, and a hatch and cover system. Such components are individually configured and correlated with respect to each other so as to attain the desired objective.

The ship 12 is capable of floating in sea water. The ship 12 has bridge controls 14 to control all functions of the ship 12. The bridge controls 14 are in communication with substation controls 16, navigation controls 18, and propulsion controls 20. The bridge controls 14 further includes snow making and water harvesting controls 22. The ship 12 has a sea water intake 24. The sea water intake 24 has temperature sensors 26 in communication therewith. The sea water intake 24 further includes a supply control valve 28. The ship has an air intake 30. The air intake 30 is in communication with an air compressor 32 disposed within the ship 12. The air compressor 32 has controls 34 associated therewith.

The snow making machine 36 is positioned within the ship 12. The snow making machine 36 is in communication with the sea water intake 24 for receiving sea water therefrom and the air compressor 32. The snow making machine 36 converts the sea water to snow for being stored in holds 38 on the ship 12.

The brine bilge system 40 accumulates brine drained from the snow. The brine bilge system 40 includes a sump and controls 42 for monitoring the brine in the holds 38 and pumping the brine out of the holds 38.

The bottling system 44 is in communication with the holds 38. The bottling system 44 includes extraction pumps with supply lines for drawing fresh water out of the holds 38 for storing in bottles.

The hold control system is in communication with the holds 38 of the ship 12. The hold control system selectively heats 46 or cools 48 the holds 38. The hold control system further includes a monitor 50.

The hatch and cover system 52 covers and protects hatchways and deck openings in the ship 12.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A ship with snow making capabilities utilizing sea water for making snow from sea water by separating brine therefrom comprising, in combination:

a ship capable of floating in sea water, the ship having bridge controls to control all functions of the ship, the bridge controls being in communication with substation controls, navigation controls, and propulsion controls, the bridge controls further including snow making and water harvesting controls, the ship having a sea water intake, the sea water intake having temperature sensors in communication therewith, the sea water intake further including a supply control valve, the ship having an air intake, the air intake being in communication with an air compressor disposed within the ship, the air compressor having controls associated therewith;

a snow making machine positioned within the ship, the snow making machine being in communication with the sea water intake for receiving sea water therefrom, the snow making machine converting the sea water to snow for being stored in holds on the ship;

a brine bilge system accumulating brine drained from the snow, the brine bilge system including a and controls for monitoring the brine in the holds and pumping the brine out of the holds;

a bottling system in communication with the holds, the bottling system including extraction pumps with supply lines for drawing fresh water out of the holds for storing in bottles;

a hold control system in communication with the holds of the ship, the hold control system selectively heating or cooling the holds, the hold control system further including a monitor;

a hatch and cover system covering and protecting hatchways and deck openings in the ship.

2. A ship with snow making capabilities utilizing sea water for making snow from sea water by separating brine therefrom comprising, in combination:

a ship capable of floating in sea water, the ship having bridge controls to control all functions of the ship, the bridge controls being in communication with substation controls, navigation controls, and propulsion controls, the bridge controls further including snow making and water harvesting controls, the ship having a sea water intake, the ship having an air intake, the air intake being in communication with an air compressor disposed within the ship, the air compressor having controls associated therewith;

a snow making machine positioned within the ship, the snow making machine being in communication with the sea water intake for receiving sea water therefrom, the snow making machine converting the sea water to snow for being stored in holds on the ship;

a brine bilge system accumulating brine drained from the snow, the brine bilge system including a sump and controls for monitoring the brine in the holds and pumping the brine out of the holds.

3. The ship with snow making capabilities utilizing sea water as set forth in claim 2 wherein the sea water intake having temperature sensors in communication therewith.

4. The ship with snow making capabilities utilizing sea water as set forth in claim 3 wherein the sea water intake further includes a supply control valve.

5. The ship with snow making capabilities utilizing sea water as set forth in claim 2 and further including a bottling system in communication with the holds, the bottling system including extraction pumps with supply lines for drawing fresh water out of the holds for storing in bottles.

6. The ship with snow making capabilities utilizing sea water as set forth in claim 2 and further including a hold control system in communication with the holds of the ship, the hold control system selectively heating or cooling the holds, the hold control system further including a monitor.

7. The ship with snow making capabilities utilizing sea water as set forth in claim 2 and further including a hatch and cover system covering and protecting hatchways and deck openings in the ship.

* * * * *